United States Patent
Hsieh

(10) Patent No.: US 7,561,395 B1
(45) Date of Patent: Jul. 14, 2009

(54) VOLTAGE CONTROL CIRCUIT

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/050,901

(22) Filed: Mar. 18, 2008

(30) Foreign Application Priority Data

Dec. 28, 2007 (CN) .......................... 2007 1 0203518

(51) Int. Cl.
*H02H 3/20* (2006.01)
*H01H 9/00* (2006.01)
(52) U.S. Cl. ..................................... 361/91.5; 361/189
(58) Field of Classification Search ................ 361/91.5, 361/189
See application file for complete search history.

(56) References Cited

U.S. PATENT DOCUMENTS

| | | | | |
|---|---|---|---|---|
| 3,082,331 A * | 3/1963 | Peaslee | ........................ | 307/417 |
| 3,139,562 A * | 6/1964 | Freeborn | .................... | 361/187 |
| 3,311,907 A * | 3/1967 | Teal | ........................... | 340/662 |
| 3,571,608 A * | 3/1971 | Hurd, III | ...................... | 361/77 |
| 3,621,333 A * | 11/1971 | Gilchrist et al. | ............... | 361/20 |
| 3,657,603 A * | 4/1972 | Adams | ......................... | 361/56 |
| 3,723,829 A * | 3/1973 | Schartmann | ................ | 361/196 |
| 5,166,854 A * | 11/1992 | Morishige | .................. | 361/91.6 |
| 5,590,013 A * | 12/1996 | Harasawa | .................... | 361/187 |
| 6,040,969 A * | 3/2000 | Winch et al. | .................. | 361/82 |

* cited by examiner

*Primary Examiner*—Ronald W Leja
(74) *Attorney, Agent, or Firm*—Frank R. Niranjan

(57) ABSTRACT

A voltage control circuit includes first, second and third transistors, a relay, and first, second, and third resistors. The emitter of the first transistor is connected to a first power supply, the collector of the first transistor is connected to a first contact of the relay, a second contact of the relay is grounded; the collector of the third transistor is connected to the first power supply via the third resistor, and the emitter of the third transistor is grounded. The first and second resistors are connected in series between the positive electrode of the second power supply; the base of the second transistor is connected to a node between the first and second resistors, the collector of the second transistor is connected to the base of the third transistor, and the emitter of the second transistor is connected to the first power supply.

6 Claims, 1 Drawing Sheet

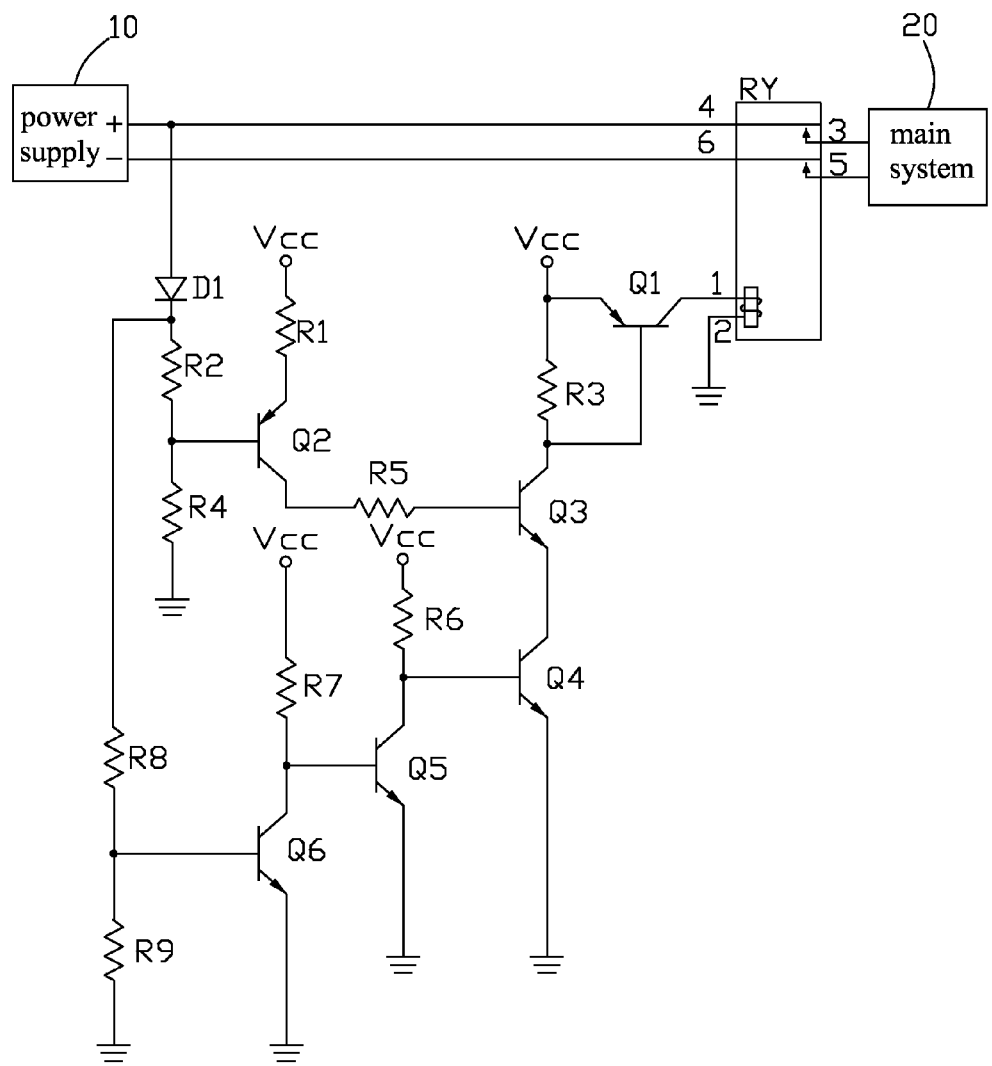

VOLTAGE CONTROL CIRCUIT

BACKGROUND

1. Field of the Invention

The present invention relates to a voltage control circuit.

2. Description of Related Art

Electronic devices are designed to operate in a certain voltage range, and damage can be caused by voltage that exceeds the maximum voltage the electronic devices are rated for.

What is needed, therefore, is a voltage control circuit which can prevent the electronic devices from being damaged.

SUMMARY

An exemplary voltage control circuit includes first, second and third transistors, a relay, and first, second, and third resistors. The emitter of the first transistor is connected to a first power supply, the collector of the first transistor is connected to a first contact of the relay, a second contact of the relay is grounded, third and fourth contacts of the relay are respectively connected to positive and negative electrodes of the second power supply, fifth and sixth contacts of the relay are connected to a main system. The collector of the third transistor is connected to the first power supply via the third resistor, and is also connected to the base of the first transistor, and the emitter of the third transistor is grounded. The first and second resistors are connected in series between the positive electrode of the second power supply and ground; the base of the second transistor is connected to a node between the first and second resistors, the collector of the second transistor is connected to the base of the third transistor, and the emitter of the second transistor is connected to the first power supply.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a voltage control circuit in accordance with an embodiment of the present invention.

DETAILED DESCRIPTION

Referring to the drawing, a voltage control circuit in accordance with an embodiment of the present invention includes a diode D1, transistors Q1~Q6, resistors R1~R9 and a relay RY. The transistors Q1 and Q2 are PNP transistors, the transistors Q3~Q6 are NPN transistors. The anode of the diode D1 is connected to a positive electrode of a power supply 10, the cathode of the diode D1 is grounded via the resistor R2 and the resistor R4 connected in series, and is also grounded via the resistor R8 and the resistor R9 connected in series. The base of the transistor Q2 is connected to a node between the resistor R2 and the resistor R4, the collector of the transistor Q2 is connected to the base of the transistor Q3 via the resistor R5, and the emitter of the transistor Q2 is connected to a power supply Vcc via the resistor R1. The collector of the transistor Q3 is connected to the power supply Vcc via the resistor R3, and the emitter of the transistor Q3 is connected to the collector of the transistor Q4. The base of the transistor Q1 is connected to the collector of the transistor Q3, the emitter of the transistor Q1 is connected to the power supply Vcc, and the collector of the transistor Q1 is connected to a first contact 1 of the relay RY. The base of the transistor Q4 is connected to the collector of the transistor Q5, and the emitter of the transistor Q4 is grounded. The base of the transistor Q5 is connected to the collector of the transistor Q6, the collector of the transistor Q5 is connected to the power supply Vcc via the resistor R6, and the emitter of the transistor Q5 is grounded. The base of the transistor Q6 is connected to a node between the resistor R8 and the resistor R9, the collector of the transistor Q6 is connected to the power supply Vcc via the resistor R7, and the emitter of the transistor Q6 is grounded. A second contact 2 of the relay RY is grounded, a fourth contact 4 and a sixth contact 6 are respectively connected to positive and negative electrodes of the power supply 10, and a third contact 3 and a fifth contact 5 are connected to a main system 20 such as a computer or other electronic device. A coil of the relay RY is connected between the first contact 1 and the second contact 2 of the relay RY.

If a voltage supplied from the power supply 10 is lower than a maximum rated voltage of the main system 20, the transistor Q2 turns on. When the main system 20 receives voltage supplied by the power supply 10 higher than a minimum rated voltage of the main system 20, the transistor Q6 turns on.

If the output voltage supplied by the power supply 10 is within the rated voltage range of the main system 20 and the positive and negative electrodes of the power supply 10 are respectively connected to the positive and negative electrodes of the main system 20, the transistor Q2 and the transistor Q3 turn on. At the same time, the transistor Q6 turns on, the transistor Q5 turns off, the transistor Q4 turns on, the transistor Q1 turns on, and there is a current flow from the first contact 1 of the relay RY to the second contact 2 of the relay RY. The third contact 3 of the relay RY is connected to the fourth contact 4 of the relay RY, the fifth contact 5 of the relay RY is connected to the sixth contact 6 of the relay RY, the relay RY turns on, and the power supply 10 supplies voltage to the main system 20.

If the output voltage supplied by the power supply 10 is higher than the maximum rated voltage of the main system 20, the transistors Q1, Q2, and Q3 turn off. There is no current flow from the first contact 1 of the relay RY to the second contact 2 of the relay RY, and the relay RY turns off. The power supply 10 does not supply voltage to the main system 20, and the main system 20 is protected from being damaged by the over voltage.

If the output voltage supplied by the power supply 10 is lower than a minimum rated voltage of the main system 20, the transistor Q6 turns off, the transistor Q5 turns on, and the transistors Q1, Q3, Q4 turn off. There is no current flow from the first contact 1 of the relay RY to the second contact 2 of the relay RY, the relay RY turns off. The power supply 10 does not supply voltage to the main system 20.

If the positive and the negative electrodes of the power supply 10 are respectively connected to negative and positive electrodes of the main system 20, the diode D1 turns off, the transistor Q6 turns off, the transistor Q5 turns on, the transistor Q4 turns off, the transistor Q3 turns off, and the transistor Q1 turns off. There is no current flow from the first contact 1 of the relay RY to the second contact 2 of the relay RY, and the relay RY turns off. The power supply 10 does not supply voltage to the main system 20.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A voltage control circuit comprising: first, second and third transistors, a relay, and first, second, and third resistors; the emitter of the first transistor connected to a first power supply, the collector of the first transistor connected to a first contact of the relay, a second contact of the relay grounded, third and fourth contacts of the relay respectively connected to positive and negative electrodes of the second power supply, fifth and sixth contacts of the relay connected to a main system; the collector of the third transistor connected to the first power supply via the third resistor, and also connected to the base of the first transistor, the emitter of the third transistor grounded; the first and second resistors connected in series between the positive electrode of the second power supply and ground; the base of the second transistor connected to a node between the first and second resistors, the collector of the second transistor connected to the base of the third transistor, and the emitter of the second transistor connected to the first power supply.

2. The voltage control circuit as claimed in claim 1, wherein the voltage control circuit comprises a fourth resistor and a fifth resistor, the fourth resistor is connected to a node between the emitter of the second transistor and the first power supply; the fifth resistor is connected to a node between the collector of the second transistor and the base of the third transistor.

3. The voltage control circuit as claimed in claim 2, wherein the voltage control circuit comprises a fourth transistor, a fifth transistor, a sixth transistor, a sixth resistor, a seventh resistor, an eighth resistor and a ninth resistor, the emitter of the sixth transistor is grounded, the base of the sixth transistor is connected to a node between the eighth resistor and the ninth resistor, the collector of the sixth transistor is connected to the first power supply via the seventh resistor; the base of the fifth transistor is connected to the collector of the sixth transistor, the collector of the fifth transistor is connected to the first power supply via the sixth resistor, the emitter of the fifth transistor is grounded; the base of the fourth transistor is connected to the collector of the fifth transistor, the collector of the fourth transistor is connected to the emitter of the third transistor, the emitter of the fourth transistor is grounded; the eighth resistor and the ninth resistor are connected in series between the positive of the second power supply and ground.

4. The voltage control circuit as claimed in claim 3, wherein the fourth, fifth and sixth transistors are NPN transistors.

5. The voltage control circuit as claimed in claim 3, wherein the voltage control circuit further comprises a diode, the anode of the diode is connected to the second power supply, the cathode of the diode is grounded via the first resistor and the second resistor connected in series, and also grounded via the eighth resistor and the ninth resistor connected in series.

6. The voltage control circuit as claimed in claim 1, wherein the first and second transistors are PNP transistors, and the third transistor is an NPN transistor.

* * * * *